(No Model.)
A. McKELLAR.
CARRIAGE BRAKE.
No. 261,744. Patented July 25, 1882.
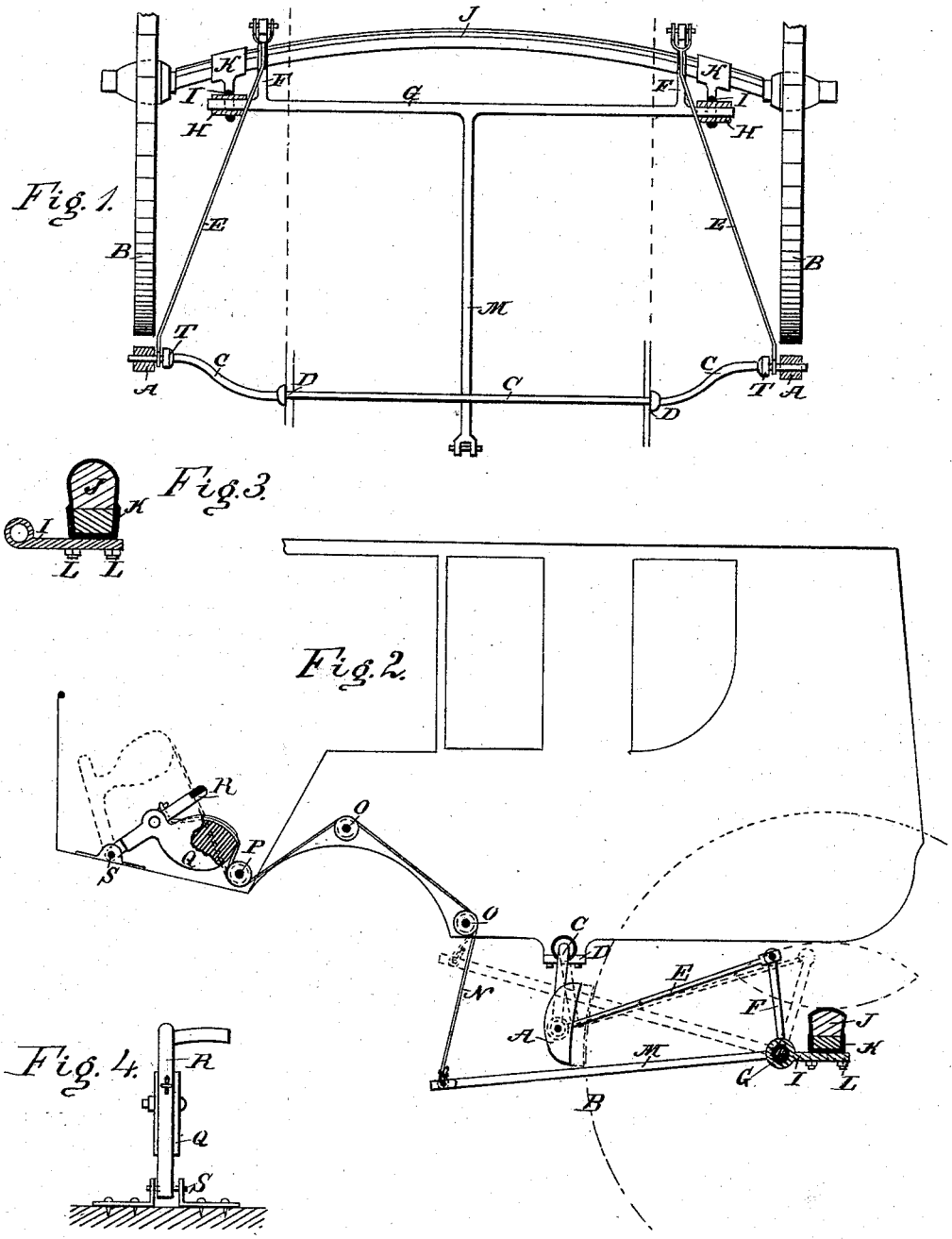
WITNESSES:
INVENTOR:
A. McKellar
BY Munn & Co
ATTORNEYS.

UNITED STATES PATENT OFFICE.

ANGUS McKELLAR, OF FORT DOUGLAS, UTAH TERRITORY.

CARRIAGE-BRAKE.

SPECIFICATION forming part of Letters Patent No. 261,744, dated July 25, 1882.

Application filed May 3, 1882. (No model.)

*To all whom it may concern:*

Be it known that I, ANGUS MCKELLAR, of Fort Douglas, in the county of Salt Lake and Territory of Utah, have invented a new and Improved Carriage-Brake, of which the following is a full, clear, and exact description.

This invention consists essentially of the contrivance of a brake for carriages, whereby the body of the carriage is relieved from the forward or backward thrust common to all arrangements wherein the thrust of the wheels on the brakes is resisted by the body, which is injurious to carriages when the brake is hung to the body. In this improved arrangement of the brake the thrust is taken up by the axle so as to relieve the body and springs, except the downward thrust consequent upon the brake-blocks being suspended from the body, but which is not injurious, as hereinafter more fully described.

Reference is to be had to the accompanying drawings, forming a part of this specification, in which similar letters of reference indicate corresponding parts in all the figures.

Figure 1 is a top view of the hind part of the running-gear of a carriage, in perspective, the body being removed and some of the parts being sectioned. Fig. 2 is a side elevation of the body and the brake apparatus with a section of the axle and some of the brake apparatus. Fig. 3 is a section of the axle and a clip by which the brake-lever is connected to the axle, and Fig. 4 is an elevation of the foot-lever employed for applying the brake.

The brake-shoes A are suspended in front of the wheels B by the cranked shaft C, which has bearings D, attached to the under side of the bottom of the carriage-body in the usual way. I propose to connect these shoes by rods E to the short arms F of a rock-shaft, G, which has bearings H in the eye-clips I, attached to the axle J by the yokes K and nuts L. The rock-shaft has a long arm, M, extending forward under the middle of the body, or one side, if preferred, to about where the body is "cut away" for the fore wheels to swing under in turning about. To the forward end of this arm a wire rope, N, is connected, which passes over wooden grooved guide-rollers, O, to the foot-rest for the driver, where it passes under a roller, P, and thence up to the grooved eccentric arm Q of a foot-lever R, pivoted at S to be pushed forward so as to raise arm Q, and thus draw the brake A against the wheels by raising arm M of rock-shaft G. When the brake is applied to other forms of wagons or carriages not having the cut-away for the front wheels the rope N may be differently arranged, according to circumstances, only one grooved roller being required for a straight body. It will be seen that in this arrangement there will not be either forward or backward thrust on the body.

I propose in practice to pack the joints of rods E and arms F with leather or other approved substance to prevent rattling. The rods E are attached to the cranked rod C by an eye of said rods slipped on the ends of rod C before the brake-shoes are attached, and by them confined against the collars T of the rod, so as to avoid any slack, and thus prevent rattling.

If desired, leather washers may be employed between the rod joints and collar; also, between the rods and shoes, and rubber housings may be used in the clip-yoke and collar of rock-shaft.

Having thus described my invention, I claim as new and desire to secure by Letters Patent—

The lever M, connected by rock-shaft G, arms F, and rods E with the brake-shoes A, and also connected with the foot-lever R by wire rope N and eccentric arm Q of said foot-lever, said rope passing over guide-pulleys O, around the cut-away of the carriage-body, and under roller P to said lever-arm, substantially as described.

ANGUS McKELLAR.

Witnesses:
JOS. F. SIMMONS,
DANIEL DUNNE.